United States Patent
Hicks et al.

(10) Patent No.: US 10,761,923 B2
(45) Date of Patent: Sep. 1, 2020

(54) COLLISION DETECTION FOR SLAVE STORAGE DEVICES

(71) Applicant: Western Digital Technologies, Inc., San Jose, CA (US)

(72) Inventors: Mark Robert Hicks, Anaheim, CA (US); George Christopher Sneed, Irvine, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 189 days.

(21) Appl. No.: 16/022,542

(22) Filed: Jun. 28, 2018

(65) Prior Publication Data

US 2018/0307552 A1 Oct. 25, 2018

Related U.S. Application Data

(63) Continuation of application No. 15/139,988, filed on Apr. 27, 2016, now Pat. No. 10,019,306.

(51) Int. Cl.
*G06F 11/00* (2006.01)
*G06F 11/07* (2006.01)
(Continued)

(52) U.S. Cl.
CPC .............. *G06F 11/079* (2013.01); *G06F 5/14* (2013.01); *G06F 11/0727* (2013.01);
(Continued)

(58) Field of Classification Search
CPC ............... G06F 11/079; G06F 11/0727; G06F 11/0751; G06F 11/0793; G06F 11/1004;
(Continued)

(56) References Cited

U.S. PATENT DOCUMENTS 5,715,407 A * 2/1998 Barth .................. G06F 12/0215
340/9.14
5,740,174 A 4/1998 Somer
(Continued)

FOREIGN PATENT DOCUMENTS

CN 1045884 A 10/1990
CN 101146121 A 3/2008
(Continued)

OTHER PUBLICATIONS

Carroll et al., "NVM Express Management Interface" Aug. 11, 2015, 33 pgs.
(Continued)

*Primary Examiner* — Joseph D Manoskey
(74) *Attorney, Agent, or Firm* — Patterson & Sheridan, LLP; Steven Versteeg

(57) ABSTRACT

A method includes transmitting, by a controller of a storage device, a first bit on a data line. The method further includes responsive to transmitting the first bit on the data line, determining, by the controller, a line level of the data line. The method further includes responsive to determining the line level of the data line, determining, by the controller, whether the line level of the data line corresponds to the first bit and responsive to determining that the line level of the data line does not correspond to the first bit, determining, by the controller, that a collision has occurred on the data line.

24 Claims, 4 Drawing Sheets

(51) Int. Cl.
*G06F 11/10* (2006.01)
*G06F 5/14* (2006.01)
*G06F 13/42* (2006.01)

(52) U.S. Cl.
CPC ...... *G06F 11/0751* (2013.01); *G06F 11/0793* (2013.01); *G06F 11/1004* (2013.01); *G06F 13/4282* (2013.01); *G06F 2205/126* (2013.01)

(58) Field of Classification Search
CPC ............. G06F 11/0745; G06F 11/3027; G06F 11/3034; G06F 11/3041; G06F 5/14; G06F 13/4282; G06F 2205/126
See application file for complete search history.

(56) References Cited

U.S. PATENT DOCUMENTS

| | | | |
|---|---|---|---|
| 6,625,163 | B1 | 9/2003 | Shideler et al. |
| 7,882,290 | B2 | 2/2011 | Lin |
| 8,271,587 | B2 | 9/2012 | Ishizaki et al. |
| 8,521,932 | B2 | 8/2013 | Wu et al. |
| 8,799,699 | B2 | 8/2014 | Hashimoto |
| 8,819,310 | B2 | 8/2014 | Jeong et al. |
| 2007/0058663 | A1 | 3/2007 | McGee et al. |
| 2011/0219160 | A1 | 9/2011 | Lambrache et al. |
| 2013/0322462 | A1 | 12/2013 | Poulsen |
| 2014/0372645 | A1 | 12/2014 | Heckrott et al. |
| 2015/0032936 | A1 | 1/2015 | Yu et al. |
| 2015/0235062 | A1* | 8/2015 | Greefkes ............ G06K 7/10019 340/10.2 |
| 2015/0248373 | A1* | 9/2015 | Sengoku ............. H03M 13/096 714/56 |
| 2016/0240244 | A1* | 8/2016 | Shankar ................ G11C 11/419 |
| 2017/0017559 | A1* | 1/2017 | Jarok ................. G06F 11/0757 |
| 2017/0091127 | A1 | 3/2017 | Khan et al. |

FOREIGN PATENT DOCUMENTS

| | | |
|---|---|---|
| CN | 101499043 A | 8/2009 |
| CN | 102435076 A | 5/2012 |
| CN | 104145256 A | 11/2014 |

OTHER PUBLICATIONS

NVM Express Management Interface, Revision 1.0, Nov. 17, 2015, 96 pgs.
Techincal Note: NVMe Simple Management Interface, Revision 1.0, Feb. 24, 2015, 5 pgs.
System Management Bus {SMBus) Specification, Version 2.0, Aug. 3, 2000, 59 pgs.
Office Action issued in corresponding Chinese Patent Application No. 201710128336X, dated Aug. 2, 2019 (10 pages).
Search Report issued in Corresponding Chinese Patent Application No. 201710128336X, dated Jul. 17, 2019 (2 pages).

* cited by examiner

COLLISION DETECTION FOR SLAVE STORAGE DEVICES

CROSS-REFERENCE TO RELATED APPLICATIONS

The present application is a continuation of and claims priority to U.S. patent application Ser. No. 15/139,988, filed Apr. 27, 2016. The forgoing application is herein incorporated by reference in its entirety.

TECHNICAL FIELD

The disclosure generally relates to storage devices.

BACKGROUND

A bus is a communication system that transfers data between storage devices. Buses may be parallel buses which carry data words in parallel on multiple wires or serial buses which carry data in bit-serial form. Collisions may occur if multiple storage devices on a bus transmit data at the same time which may result in a corruption of the data on the bus. In an attempt to avoid such collisions, the storage devices may be configured with specialized hardware that supports various arbitration schemes.

SUMMARY

In one example, a method includes transmitting, by a controller of a storage device, a first bit on a data line. The method further includes responsive to transmitting the first bit on the data line, determining, by the controller, a line level of the data line. The method further includes responsive to determining the line level of the data line, determining, by the controller, whether the line level of the data line corresponds to the first bit and responsive to determining that the line level of the data line does not correspond to the first bit, determining, by the controller, that a collision has occurred on the data line.

In another example, a storage device includes a plurality of memory devices logically divided into a plurality of blocks and a controller. The controller is configured to transmit a first bit on a data line and responsive to transmitting the first bit on the data line, determine a line level of the data line. The controller is further configured to responsive to determining the line level of the data line, determine whether the line level of the data line corresponds to the first bit and responsive to determining that the line level of the data line does not correspond to the first bit, determine that a collision has occurred on the data line.

In another example, a non-transitory computer-readable storage medium encoded with instructions that, when executed, cause one or more processors of a storage device to transmit a first bit on a data line and responsive to transmitting the first bit on the data line, determine a line level of the data line. The instructions further configure one or more processors of the storage device to responsive to determining the line level of the data line, determine whether the line level of the data line corresponds to the first bit and responsive to determining that the line level of the data line does not correspond to the first bit, determine that a collision has occurred on the data line.

In another example, a system includes means for transmitting a first bit on a data line, means for determining a line level of the data line in response to transmitting the first bit on the data line, means for determining whether the line level of the data line corresponds to the first bit in response to determining the line level of the data line, and means for determining that a collision has occurred on the data line in response to determining that the line level of the data line does not correspond to the first bit.

DETAILED DESCRIPTION

The techniques of this disclosure may enable devices without specialized hardware to detect collisions on a shared bus. For example, a slave device may write to a shared bus and determine a line level of the shared bus to determine whether the line level is the expected line level. If the line level is not the expected line level, the slave device may determine that there was a collision and cease further communication on the bus until a next start condition. More specifically, techniques of this disclosure may enable a controller of a storage device to execute code that causes the controller to read a system bus data line of a shared bus, determine a current line level of the system bus data line, compare the current line level to an expected line level, and, if the current line level and the expected line level are sufficiently different, determine that a collision occurred. In this way, slave devices without specialized collision detection hardware may be configured to detect collisions, which may enable multiple devices to operate on a single shared bus while maintaining data integrity.

Figure 1:
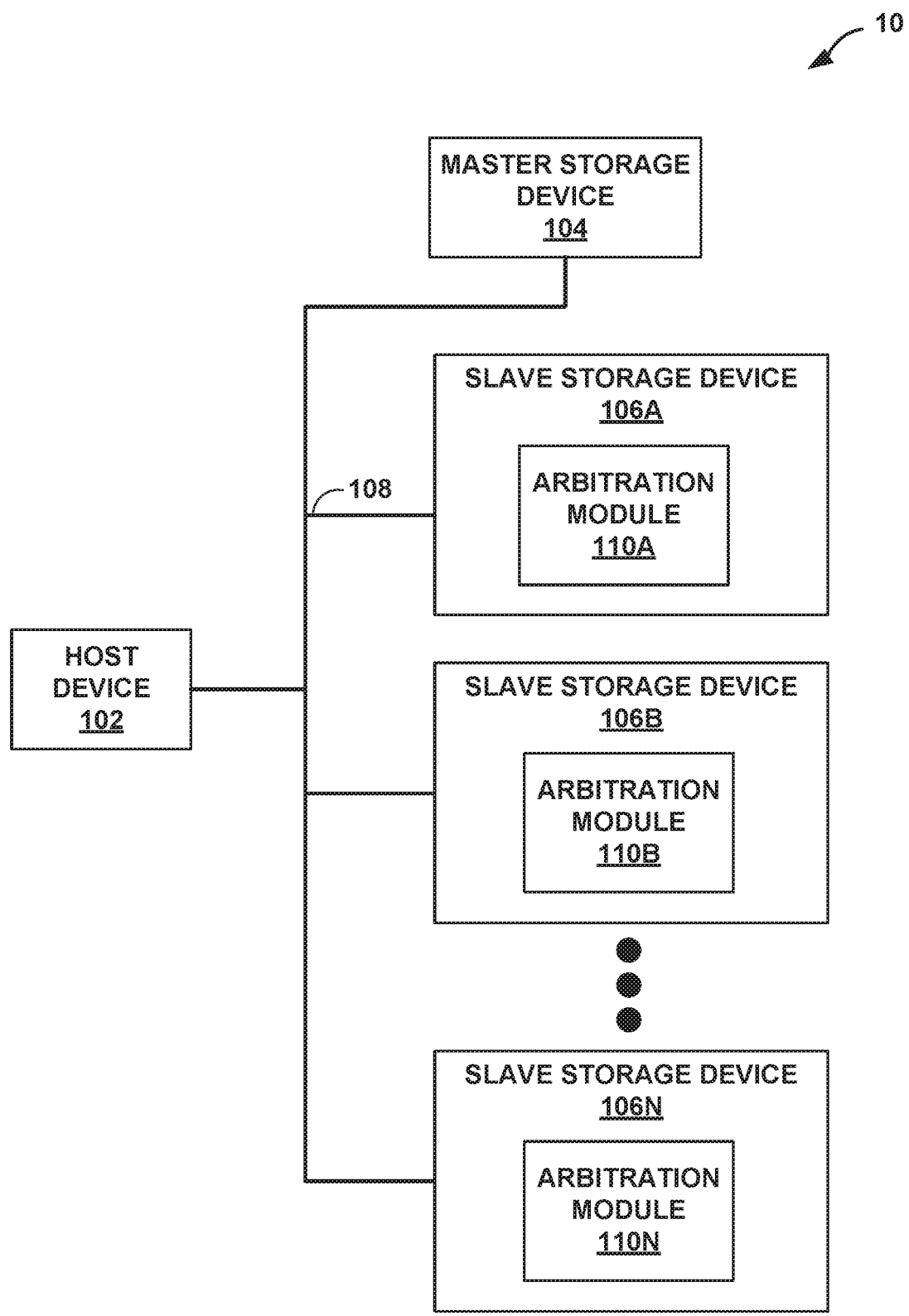
FIG. 1 is a conceptual and schematic block diagram illustrating an example storage environment in which multiple storage devices may interact with a host device, in accordance with one or more techniques of this disclosure.

FIG. 1 is a conceptual and schematic block diagram illustrating an example storage environment 10 in which multiple storage devices may interact with host device 102, in accordance with one or more techniques of this disclosure. Storage environment 10 may include host device 102 connected by bus 108 to master storage device 104 and a plurality of slave storage devices 106A-106N (collectively, "slave storage devices 106"). In some examples, bus 108 may support communication between host device 102 with master storage device 104 and multiple slave storage devices 106. In some examples, slave storage devices 106 may share a common address on bus 108. In some examples, bus 108 may be compliant with a NVME MI specification, such as the NVME MI specification described in NVM Express Management Interface Revision 1.0, Nov. 17, 2015, the entire content of which is incorporated herein by reference.

Master storage device 104 may be configured to control slave storage devices 106. For instance, master storage device 104 may transmit a stop command to slave storage devices 106 via bus 108 that causes slave storage devices 106 to stop transmitting onto bus 108. In some instances, master storage device 104 may transmit a start command to slave storage devices 106 via bus 108 that causes one or more of slave storage devices 106 to start transmitting onto bus 108.

Master storage device 104 may be any device suitable for storing data that may be accessed by host device 102 using bus 108. In some examples, master storage device 104 may include a non-volatile memory array (e.g., solid-state drive (SSD)) to store the data that may be accessed by host device 102 using bus 108. For instance, master storage device 104 may include a controller, non-volatile memory array, cache, and interface. In some examples, master storage device 104 may include a magnetic recording (e.g., hard disk drive (HDD)) to store the data that may be accessed by host device 102 using bus 108. For instance, master storage device 104 may include a controller, a shingled magnetic recording, cache, and interface.

In some examples, master storage device 104 may be substantially similar to slave storage devices 106 except that master storage device 104 is treated as a master device on bus 108. For instance, master storage device 104 may generate a clock signal that may be used by slave storage devices 106. In some instances, master storage device 104 may include an arbitration module. In some examples, master storage device 104 and slave storage devices 106 may be different. For instance, master storage device 104 may omit an arbitration module. In some examples, master storage device 104 may be complaint with System Management (SM) Bus (SMBus), such as the SMBus described in System Management Interface Forum, Inc., "System Management Bus (SMBus) Specification Version 3.0", Dec. 20, 2014, the entire content of which is incorporated herein by reference. For instance, master storage device 104 may be configured to perform arbitration with other master storage devices on bus 108.

Host device 102 may utilize memory devices included in master storage device 104 and slave storage devices 106 to store and retrieve data. Host device 102 may include any computing device, including, for example, a computer server, a network attached storage (NAS) unit, a desktop computer, a notebook (e.g., laptop) computer, a tablet computer, a set-top box, a mobile computing device such as a "smart" phone, a television, a camera, a display device, a digital media player, a video gaming console, a video streaming device, or the like. Host device 102 may include a processing unit, which may refer to any form of hardware capable of processing data and may include a general purpose processing unit (such as a central processing unit (CPU), dedicated hardware (such as an application specific integrated circuit (ASIC)), configurable hardware such as a field programmable gate array (FPGA) or any other form of processing unit configured by way of software instructions, microcode, firmware, or the like.

Bus 108 may include a data line for transmitting data between host device 102, master storage device 104, and slave storage devices 106. For instance, bus 108 may include a serial data line (SDA). The bus 108 may be complaint with any suitable protocol and standard. For instance, bus 108 may be complaint with SMBus. In some instances, bus 108 may be complaint with Inter-Integrated Circuit (I2C), such as the I2C described by NXP Semiconductors, "I2C-Bus Specification and User Manual," Rev. 6, Apr. 4, 2014, the entire content of which is incorporated herein by reference. In some examples, bus 108 may include a clock line for timing a data transfer. For instance, bus 108 may include a serial clock line (SCL). In some examples, the clock line may indicate timing for transferring data on a data line. For example, host device 102 may read data during a rising edge of a clock signal transmitted on the clock line of bus 108.

In some examples, each slave storage device 106 performs collision detection using a respective one of arbitration modules 110A-N (collectively, "arbitration modules 110"). For instance, arbitration module 110A of slave storage device 106A may detect an arbitration issue (e.g., collision) between slave storage devices 106 and cease a further transmission to prevent data corruption of bus 108. In some examples, arbitration modules 110 may be implemented in software. For instance, arbitration module 110A may include firmware that, when executed, detects a collision. In some examples, arbitration modules 110 may operate with a bus communication unit. For instance, a firmware of arbitration module 110A may determine whether a collision has occurred on the data line of bus 108 and the bus communication unit may determine when to transmit data on the data line of bus 108 (e.g., a rising edge of a clock line of bus 108).

Arbitration modules 110 may synchronize with bus 108 to determine when to transmit data. In some examples, arbitration modules 110 may initiate a transmission of data in response to a transmit buffer empty event. For instance, after receiving an indication of the transmit buffer empty event, arbitration module 110A may monitor bus 108 for an acknowledgment and begin monitoring a transmission of data on bus 108 a clock cycle after detecting the acknowledgment. In this manner, arbitration module 110 may synchronize with bus 108 to detect a collision.

After synchronizing with bus 108, arbitration modules 110 may determine whether a collision has occurred on bus 108. For instance, arbitration module 110A may determine that a collision has occurred on bus 108 if a line level (e.g., a logical '1') on bus 108 does not match an expected line level (e.g., a logical '1' output into a transmit holding register). In some examples, the line level and the expected line level may not match if more than one slave storage device of slave storage devices 106 transmits on bus 108. For instance, a line level on bus 108 may indicate a logical '0' if arbitration module 110A transmits a logical '1' and, during the same clock cycle, arbitration module 110B transmits a logical '0'.

Slave storage devices 106 may cease transmitting on bus 108 if a collision has occurred on bus 108. For instance, if arbitration module 110A determines that a collision has occurred on bus 108, arbitration module 110A may cause slave storage device 106A to cease transmitting on bus 108. In this manner, arbitration modules 110 may perform arbitration by attempting to access bus 108 and ceasing an output for transmission on bus 108 in response to detecting a collision on bus 108.

Figure 2:
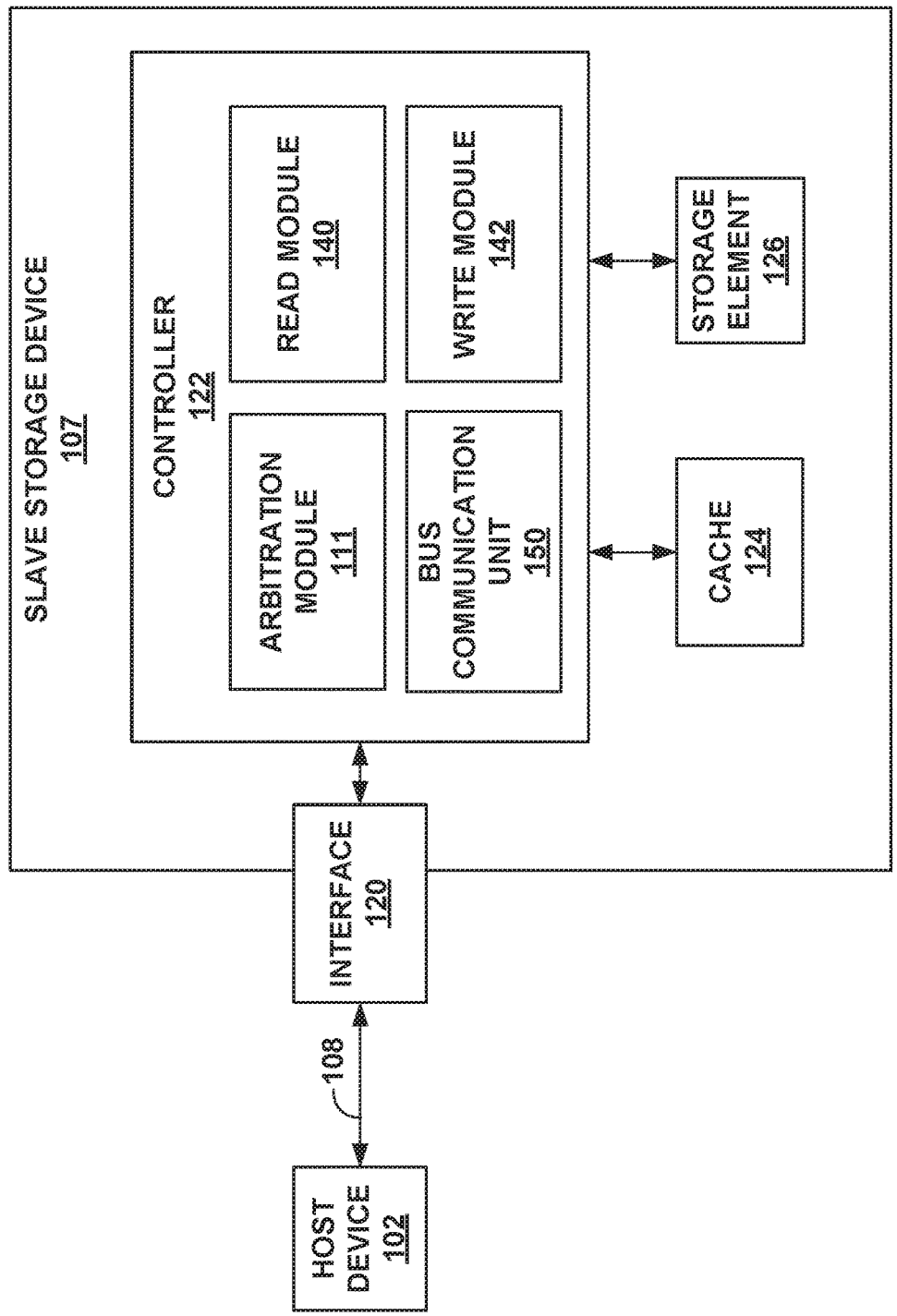
FIG. 2 is a conceptual and schematic block diagram illustrating an example storage environment in which a storage device may interact with a host device, in accordance with one or more techniques of this disclosure.

FIG. 2 is a conceptual and schematic block diagram illustrating example storage environment 12 in which slave storage device 107 may interact with host device 102, in accordance with one or more techniques of this disclosure. As illustrated in FIG. 2, slave storage device 107 may include controller 122, storage element 126, cache 124, and interface 120. In some examples, slave storage device 107 may include additional components not shown in FIG. 2 for sake of clarity. For example, slave storage device 107 may include power delivery components, including, for example, a capacitor, super capacitor, or battery; a printed board (PB) to which components of slave storage device 107 are mechanically attached and which includes electrically conductive traces that electrically interconnect components of slave storage device 107; or the like.

Slave storage device 107 may be communicatively coupled to host device 102 via interface 120. Interface 120 may provide a mechanical connection, and electrical connection, or both to host device 102. For instance, interface 120 may be configured to connect to a data line of bus 108. In some instances, interface 120 may be configured to connect to a clock line of bus 108. Interface 120 may operate in accordance with any suitable protocol. For example, interface 120 may operate in accordance with Non-Volatile Memory (NVM) Express™ (NVMe), such as the NVM subsystem described in "NVMe Revision 1.2a," Oct. 23, 2015, the entire content of which is incorporated herein by reference. In some instances, interface 120 may operate in accordance with one or more of the following protocols: NVMe, NVMe MI, I2C, advanced technology attachment (ATA) (e.g., serial-ATA (SATA), and parallel-ATA (PATA)), fibre channel, small computer system interface (SCSI), serially attached SCSI (SAS), peripheral component interconnect (PCI), and PCI-express. The electrical connection of interface 120 (e.g., the data bus, the control bus, the clock bus, etc.) may be electrically connected to controller 122, providing electrical connection between host device 102 and controller 122, allowing data to be exchanged between host device 102 and controller 122.

Cache 124 may store data for transmission onto bus 108. For instance, controller 122 may write data into a transmit holding register of cache 124. Then, at a later time (e.g., during a rising clock edge of a clock signal), interface 120 may transmit the data stored in the transmit holding register of cache 124 onto bus 108 to host device 102. In some examples, cache 124 may include volatile memory. In some examples, cache 124 may include non-volatile memory. For instance, controller 122 may store cached information in cache 124 until cached information is written to storage element 126. Examples of cache 124 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

In some examples, storage element 126 may include a memory array (e.g., SSD) to store the data that may be accessed by host device 102 using bus 108. For instance, controller 122 may read and write to a non-volatile memory array of storage element 126 in response to receiving a command from host device 102 over bus 108. In some examples, storage element 126 may include a magnetic recording (e.g., HDD) to store the data that may be accessed by host device 102 using bus 108. For instance, controller 122 may read and write to a shingled magnetic recording (SMR) of storage element 126 in response to receiving a command from host device 102 over bus 108. In some examples, storage element 126 may include a combination of SSD elements and HDD elements. For instance, storage element 126 may include a shingled magnetic recording and a volatile memory array. In some examples, storage element 126 may have a large storage capacity, for example, 512 MB, 1 GB, 2 GB, 4 GB, 8 GB, 16 GB, 32 GB, 64 GB, 128 GB, 256 GB, 512 GB, 1 TB, 3 TB or the like.

In some examples, controller 122 may include write module 142, read module 140, arbitration module 111, and bus communication unit 150. In other examples, controller 122 may include additional modules or hardware units, or may include fewer modules or hardware units. Controller 122 may include a microprocessor, digital signal processor (DSP), application specific integrated circuit (ASIC), field programmable gate array (FPGA), or other digital logic circuitry.

Read module 140 and write module 142 of controller 122 may manage reading and writing to storage element 126. For instance, in response to write module 142 receiving a command from host device 102 instructing slave storage device 107 to store data in storage element 126, write module 142 may determine a physical address and/or track of storage element 126 to store the data.

After write module 142 writes the data in storage element 126, read module 140 may retrieve the data from the physical address and/or track of storage element 126. For instance, in response to slave storage device 107 receiving a command from host device 102 instructing slave storage device 107 to transmit data stored in storage element 126, read module 140 may determine the physical address and/or track of storage element 126 that contains the data to transmit.

After read module 140 retrieves the data from storage element 126 the data may be transmitted onto bus 108 to host device 102. For instance, arbitration module 111 may permit write module 142 to output the data onto a transmit holding register of cache 124 and arbitration module 111 may cease permitting write module 142 to output the data onto the transmit holding register of cache 124 if a line level of bus 108 does not match with an expected line level for the data.

Bus communication unit 150 may determine when to transmit the data on a data line of bus 108. For instance, bus communication unit 150 may read data stored in a transmit holding register of cache 124 and serially transmit the data stored in the transmit holding register of cache 124 on a data line of bus 108 during a rising edge of a clock line of bus 108. Bus communication unit 150 may include a microprocessor, digital signal processor (DSP), application specific integrated circuit (ASIC), field programmable gate array (FPGA), or other digital logic circuitry.

Bus communication unit 150 may read data on bus 108. For instance, bus communication unit 150 may read, via bus 108, a request for data from host device 102. In some examples, bus communication unit 150 may monitor a clock line of bus 108 using interface 120 to determine when to read data. For instance, bus communication unit 150 may, via interface 120, detect a rising edge of a clock signal on a clock line of bus 108 and read a data line of bus 108 during rising edges of the clock signal.

Bus communication unit 150 may determine whether a transmit holding register has data to transmit on bus 108. For instance, bus communication unit 150 may detect a status of a transmit flag, and determine that the transmit holding register has data if the transmit flag is cleared. In some examples, the transmit flag may be cleared by arbitration module 111, write module 142, or the like.

In instances where a transmit holding register is empty, bus communication unit 150 may signal to arbitration module 111 that the transmit holding register is empty. In some examples, bus communication unit 150 may signal that the transmit holding register is empty using an interrupt. For instance, in response to bus communication unit 150 determining that the transmit buffer of cache 124 is empty, bus communication unit 150 may output to arbitration module 111 a transmit buffer empty event interrupt.

In response to receiving a signal that the transmit holding register of cache 124 is empty, write module 142 may output data into the transmit holding register of cache 124. For instance, in response to write module 142 receiving from bus communication unit 150 an indication of a transmit buffer empty event, write module 142 may write a next byte of data into the transmit holding register of cache 124.

Once write module 142 outputs the data into the transmit holding register of cache 124, arbitration module 111 may monitor bus 108 for an acknowledgment to synchronize with bus 108. For instance, arbitration module 110 may determine whether, during a rising edge of the next clock cycle of a clock line of bus 108, a data line of bus 108 for a line level indicates a logical '1'. If the line level indicates a logical '1' during the next clock cycle of the clock line of bus 108, then arbitration module 110 may determine that the acknowledgment has occurred on bus 108.

After sending the signal that the transmit holding register of cache 124 is empty, bus communication unit 150 may determine whether data was successfully received on bus 108. In some examples, bus communication unit 150 may determine whether data was successfully received based on a number of bits received. For instance, bus communication unit 150 may determine that data was successfully received on bus 108 if exactly one byte of data was transferred. In some examples, bus communication unit 150 may determine whether data was successfully received based on packet error checking. For instance, bus communication unit 150 may determine that data was successfully received on bus 108 if bus communication unit 150 calculates a checksum based on the data received that is equal to a checksum transmitted with the data on bus 108.

In response to bus communication unit 150 determining that data was successfully received on bus 108, bus communication unit 150 may transmit an acknowledgment indicating data was successfully received. For instance, bus communication unit 150 may, via interface 120, detect a rising edge of a clock signal on a clock line of bus 108 and read a last bit of a byte of data line of bus 108 during the rising edge of the clock signal of the clock line of bus 108. Then, after bus communication unit 150 determines that the data was successfully received, bus communication unit 150 may transmit, via bus 108, an acknowledgment during a rising edge of a clock cycle. For instance, bus communication unit 150 may drive a data line of bus 108 during a rising edge of the next clock cycle of a clock line of bus 108 to have a line level indicating a logical '1'.

After transmitting the acknowledgment, bus communication unit 150 may load data from a transmit holding register to transmit on bus 108 and may transmit the loaded data onto bus 108. For instance, bus communication unit 150 may read a next byte in a transmit buffer of cache 124 and may transmit the next byte on a data line of bus 108 during a rising edge of the clock signal of a clock line of bus 108.

In response to arbitration module 111 detecting the acknowledgment transmitted onto bus 108 and bus communication unit 150 transmitting the data onto bus 108, arbitration module 111 may determine a line level that corresponds with a bit of data output into the transmit holder register of cache 124. For instance, arbitration module 111 may detect, using interface 120 and/or bus communication unit 150, a clock cycle (e.g., rising edge, falling edge, or a region extending between the rising edge and falling edge) on a clock line of bus 108 corresponding with the acknowledgment, and may read, using interface 120 and/or bus communication unit 150, a line level on a data line of bus 108 corresponding with a clock cycle (e.g., rising edge, falling edge, or a region extending between the rising edge and falling edge) of the clock cycle immediately after the clock edge on a clock line of bus 108 corresponding with the acknowledgment.

In response to determining the line level that corresponds with the bit of data output into the transmit holder register of cache 124, arbitration module 111 may compare the line level with an expected line level to detect a collision on bus 108. For instance, arbitration module 111 may compare a logical level (e.g., a logical '1' or '0') of a bit output into the transmit holder register of cache 124 with the line level detected on a data line of bus 108 during the clock cycle that corresponds with the bit.

If the line level matches with the expected line level, arbitration module 111 may determine that a collision has not occurred on bus 108. For instance, if write module 142 output a logical '1' into the transmit holder register of cache 124 and interface 120 and/or bus communication unit 150 detected a logical '1' line level on a data line of bus 108, arbitration module 111 may determine that a collision has not occurred on bus 108.

On the other hand, if a line level does not match with an expected line level, arbitration module 111 may determine that a collision has occurred on bus 108. For instance, when write module 142 output a logical '0' into the transmit holder register of cache 124 and interface 120 and/or bus communication unit 150 detected a logical '1' line level on a data line of bus 108, arbitration module 111 may determine that a collision has occurred on bus 108.

In instances where arbitration module 111 determines that a collision has occurred on bus 108, slave storage device 107 may cease transmitting on a data line of bus 108 until a next start condition has occurred. For instance, arbitration module 111 may cause write module 142 to stop outputting data into the transmit holder register of cache 124 if the line level and the expected line level do not match until a next start condition has occurred.

Bus communication unit 150 may determine whether a start condition has occurred on bus 108. For instance, bus communication unit 150 may determine that a data line of bus 108 has been reset when host device 102 transmits a stop command (e.g., drives a data line to a logical '1') during a first clock cycle (e.g., a rising edge) of a clock line and host device 102, and in response to determining that the data line has been reset bus communication unit 150 may determine that a start condition has occurred on bus 108 when host device 102 transmits a start command (e.g., drives a data line to a logical '0') during a second clock cycle of the clock line. In some instances, bus communication unit 150 may determine that a data line of bus 108 has been reset when slave storage device 107 transmits a negative acknowledgment (NACK or NAK) command during a first clock cycle (e.g., a rising edge) of a clock line and in response to determining that the data line has been reset bus communication unit 150 may determine that a start condition has occurred on bus 108 when host device 102 transmits a start command (e.g., drives a data line to a logical '0') during a second clock cycle of the clock line.

In response to determining that a start condition has occurred on bus 108, arbitration module 111 may cause bus communication unit 150 to retry to transmit the first bit, via bus 108 to host device 102. For instance, arbitration module 111 may permit write module 142 to output data into the transmit holder register of cache 124 to cause bus communication unit 150 to retry to transmit the first bit after bus communication unit 150 determines that the data line of bus 108 has been reset and/or after a start condition has occurred (and after arbitration module 111 receives another indication of a transmit buffer empty event).

In instances where arbitration module 111 determines that no collision has occurred on bus 108, arbitration module 111 may continue to permit write module 142 to output data (e.g., second bit, third bit, etc.) into the transmit holder register of cache 124. For instance, arbitration module 111 may compare a logical level (e.g., a logical '1' or '0') of a second bit output into the transmit holder register of cache 124 with a line level detected on a data line of bus 108 during a clock cycle that corresponds with the second bit (e.g., one clock cycle after the clock cycle that corresponds with the first bit). In response to write module 142 outputting data into the transmit holder register of cache 124, bus communication unit 150 may continue to transmit data onto bus 108 until the data (e.g., byte) has been sent to host device 102.

In instances where bus communication unit 150 transmits on bus 108, bus communication unit 150 may detect whether a stop command occurs on bus 108. For instance, bus communication unit 150 may, via interface 120, detect a low to high transition of a data signal on the data line of bus 108 while a clock signal on a clock line of bus 108 is high. In some examples, the stop command may be transmitted by a master storage device (e.g., master storage device 104 of FIG. 1). In response to receiving the stop command, bus communication unit 150 may cease transmitting on bus 108 until bus 108 has been reset and/or when a start condition has occurred.

Figure 3:
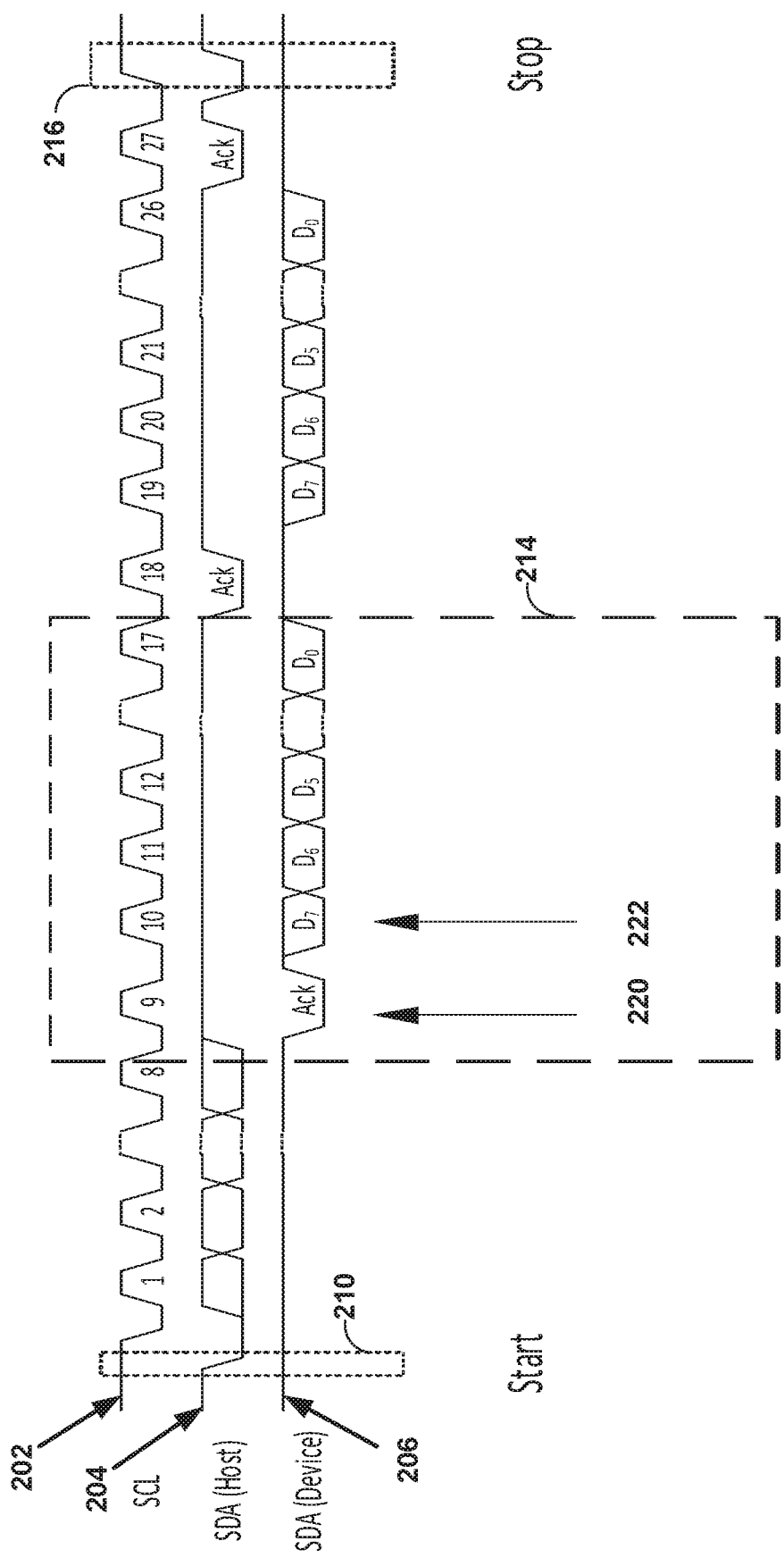
FIG. 3 is a conceptual diagram illustrating an example technique that at least one processor may implement for collision detection, in accordance with one or more techniques of this disclosure.

FIG. 3 is a conceptual diagram illustrating an example technique that at least one processor may implement for collision detection, in accordance with one or more techniques of this disclosure. The technique of FIG. 3 will be described with concurrent reference to storage environment 10 of FIG. 1 and controller 122 of FIG. 2 for ease of description. Although FIG. 3 illustrates a serial clock line as a clock line, any suitable clock signal and protocol may be used. Additionally, although FIG. 3 illustrates a serial data line as a data line, any suitable data line and protocol may be used. It should be understood that host data line signal 204 and device data line signal 206 may, in some examples, be a same data line signal, and that the separation of the data line signal is only to further illustrate how the data line signal may be driven by host device 102 and slave storage device 106A.

Host device 102 may indicate start condition 210 by driving host data line signal 204 from logical '1' to logical '0' and host device 102 may subsequently send data to slave storage device 106A on host data line signal 204. At transmitting condition 214, slave storage device 106A may drive device data line signal 206 to indicate acknowledgment 220, which indicates successful receipt of the data sent from host device 102. In some examples, acknowledgment 220 may be during a state (e.g., a transmit buffer empty event) that may be used by an arbitration module (e.g., 111 of FIG. 2) to synchronize with device data line signal 206. Next, during transmitting condition 214 and after acknowledgment 220, slave storage device 106A may drive device data line signal 206 to transmit byte 222. In some examples, an arbitration module (e.g., 111 of FIG. 2) may compare device data line signal 206 with an expected line level to determine whether a collision has occurred. As indicated in FIG. 3, if no collision has occurred, slave storage device 106A may drive device data line signal 206 to continue to transmit data until host device 102 drives host data line signal 204 to indicate stop condition 216.

Figure 4:
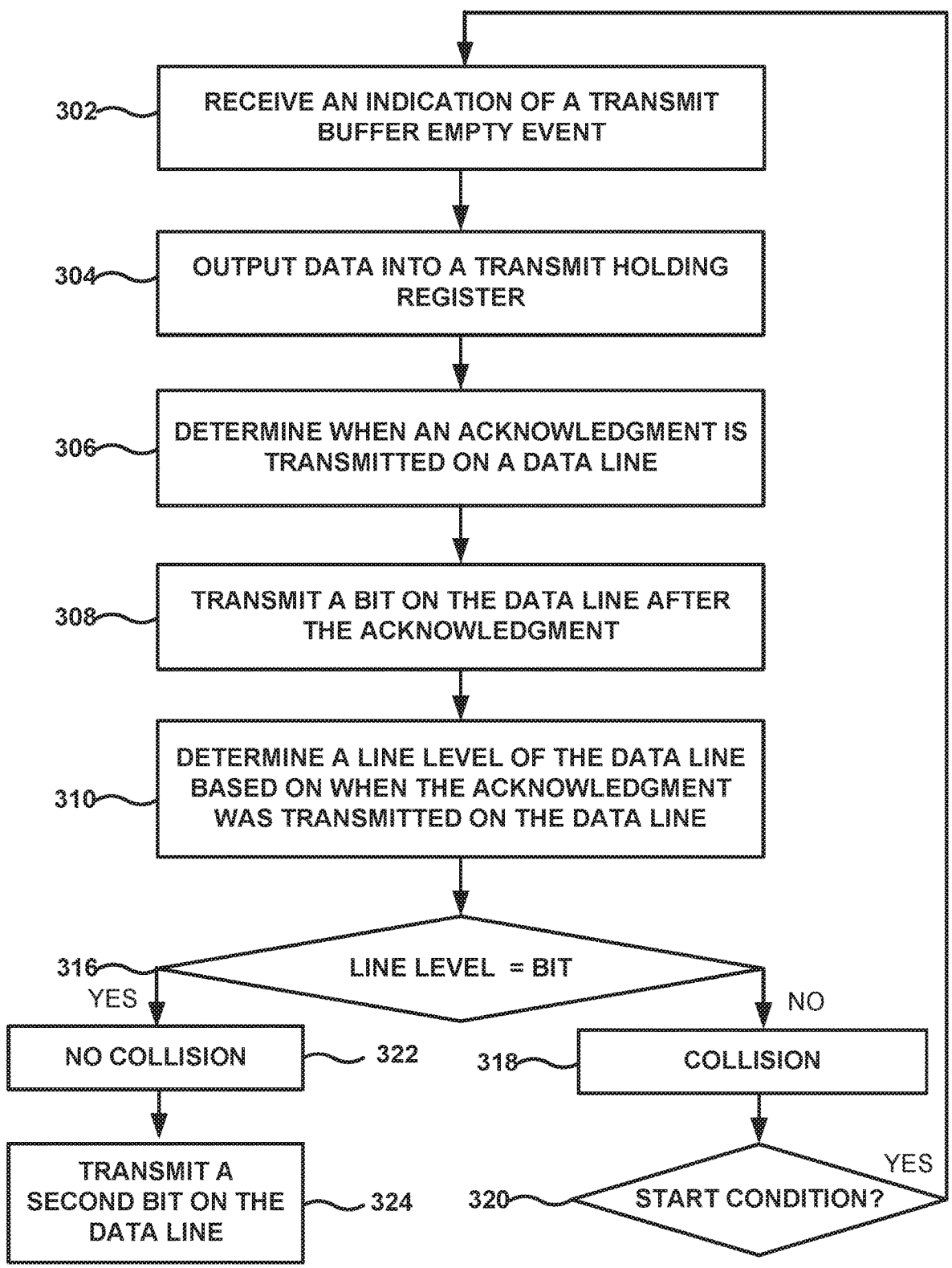
FIG. 4 is a flow diagram illustrating an example technique that at least one processor may implement for collision detection, in accordance with one or more techniques of this disclosure.

FIG. 4 is a flow diagram illustrating an example technique that at least one processor may implement for collision detection, in accordance with one or more techniques of this disclosure. The technique of FIG. 4 will be described with concurrent reference to storage environment 10 of FIG. 1 and controller 122 of FIG. 2 for ease of description.

Arbitration module 111 may receive an indication of a transmit buffer empty event (302). For instance, bus communication unit 150 may send an interrupt corresponding to a transmit buffer empty event to arbitration module 111. In response to the indication of the transmit buffer empty event, write module 142 may output data into the transmit holding register (304). For instance, after arbitration module 111 receives the interrupt corresponding to the transmit buffer empty event, arbitration module 111 may permit write module 142 to output data into the transmit holding register of cache 124. Next, arbitration module 111 may determine when an acknowledgment is transmitted by bus communication unit 150 on bus 108 (306). For instance, after arbitration module 111 receives the interrupt corresponding to the transmit buffer empty event and writes data into the transmit holding register of cache 124, arbitration module 111 may monitor a data line of bus 108 during rising edges of clock line of bus 108 for an acknowledgment. In some instances, the acknowledgment may be transmitted by bus communication unit 150 in response to detecting a successful reception of data transmitted on bus 108 to slave storage device 107. Then, slave storage device 107 may transmit a first bit on the data line of bus 108 to host device 102 (308). For instance, bus communication unit 150 may transmit a first bit on the data line of bus 108 to host device 102 that corresponds with the first bit read from transmit holding register of cache 124. Next, arbitration module 111 may determine a line level of the data line of bus 108 based on when the acknowledgment was transmitted on the data line of bus 108 (310). For instance, arbitration module 111 may detect, using interface 120 and/or bus communication unit 150, a clock edge (e.g., rising edge) on a clock line of bus 108 corresponding with the acknowledgment, and may read a line level on the data line of bus 108 corresponding with a clock edge (e.g., rising) of the clock cycle immediately after the clock edge on a clock line of bus 108 corresponding with the acknowledgment.

If the line level corresponds to the first bit ("YES" branch of 316), then slave storage device 107 may determine that no collision has occurred (322). For instance, arbitration module 111 may determine that a collision has not occurred in response to write module 142 outputting the first bit as a logical '0' to transmit holding register of cache 124 and determining that the line level corresponding to the first bit indicates a logical '0'. Next, slave storage device 107 may transmit a second bit on the data line of bus 108 (324). For instance, write module 142 may output a value for a second bit to transmit holding register of cache 124, and bus communication unit 150 may transmit the second bit on the data line of bus 108 to host device 102.

On the other hand, if the line level does not correspond to the first bit ("NO" branch of 316), then arbitration module 111 may determine that a collision has occurred (318). For instance, arbitration module 111 may determine that a collision has occurred in response to write module 142 outputting the first bit as a logical '1' to transmit holding register of cache 124 and determining that the line level corresponding to the first bit indicates a logical '0'. In response to determining that a collision has occurred, slave storage device 107 may cease further transmission on bus 108. For instance, arbitration module 111 may cease permitting write module 142 to output data (e.g., a second bit of a byte) to the transmit holding register of cache 124 until a start condition has occurred (320) before retying to send the data (e.g., restart to 302).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method, comprising:
 receiving, by a controller of a storage device, an indication of a transmit buffer empty event, wherein the storage device comprises master and slave storage devices;
 transmitting, by the controller, data into a transmit holding register;
 determining, by the controller, when an acknowledgement is received on a data line, wherein the acknowledgement indicates a successful transmission of data to the transmit holding register;
 transmitting, by the controller, a first bit on the data line in response to receiving the acknowledgement;
 determining, by the controller, a line level of the data line;
 determining, by the controller, that a data collision has not occurred when the first bit corresponds to the line level; and
 transmitting, by the controller, a second bit on the data line based on determining that a data collision has not occurred.

2. The method of claim 1, further comprising determining, by the controller, that a data collision has occurred when the first bit does not correspond to the line level.

3. The method of claim 1, further comprising receiving, by the controller, an interrupt corresponding to the transmit buffer empty event.

4. The method of claim 3, wherein transmitting, by the controller, data to the transmit holding register occurs after receiving the interrupt.

5. The method of claim 1, wherein the controller determines when the acknowledgement is received based on detecting a rising edge of a clock signal on a clock line.

6. The method of claim 1, wherein a data collision occurs when a multiple of master and slave storage devices transmit on the data bus simultaneously.

7. A device comprising:
 a storage element;
 an interface coupled to a bus;
 one or more storage devices coupled to the bus;
 an arbitration module configured to detect data collisions between the one or more storage devices; and
 a controller configured to:
  transmit a first bit on the data line in response to receiving an acknowledgement from a transmit holding register indication successful receipt of data;
  determine a line level of the data line;
  determine that a data collision has not occurred when the first bit corresponds to the line level; and
  transmit a second bit on the data line based on determining that a data collision has not occurred.

8. The device of claim 7, further comprising the controller configured to determine whether data was successfully received on the bus based on packet error checking.

9. The device of claim 7, wherein the controller is further configured to determine that a data collision has occurred when the first bit does not correspond to the line level.

10. The device of claim 7, further comprising a bus communications unit configured to transmit an acknowledgement indicating data was successfully received, wherein the acknowledgement is transmitted during a rising edge of a clock cycle of a clock signal.

11. The device of claim 7, further comprising a bus communications unit configured to determine that a data line has been reset in response to receiving a negative acknowledgement during a rising edge of a first clock cycle of a clock signal.

12. The device of claim 7, further comprising a bus communications unit configured to transmit data stored in a transmit holding register during a rising edge of a first clock cycle of a clock signal.

13. A storage device comprising:
 a controller;
 a data bus;
 an interface coupled to the data bus;
 a plurality of memory devices coupled to and configured to share the data bus; and
 means for enabling the plurality of memory devices to detect data collisions on the data bus; and
 an arbitration module configured to release data to a transmit holding register when a line level of the data bus corresponds to a first bit of a data bus.

14. The storage device of claim 13, wherein the plurality of memory devices includes one or more slave devices and at least one master device.

15. The storage device of claim 14, wherein the master device is configured to detect data collisions based on a difference between a transmitted bit and a line level of the data bus.

16. The storage device of claim 14, wherein the master device is configured to issue a stop command upon detecting a data collision.

17. The storage device of claim 14, wherein the master device is configured to enable other slave devices and master devices to transmit a bit upon determining that no data collisions exists on the data bus.

18. A method comprising:
transmitting, by a controller of a storage device, a first bit on a data line;
determining, by the controller, a line level of the data line after transmitting the first bit to the data line;
determining, by the controller, whether the line level of the data line corresponds to the first bit;
determining, by the controller, that a collision occurred on the data line in response to determining that the line level of the data line does not correspond to the first bit;
receiving an indication of a transmit buffer empty event;
outputting the first bit into a transmit holding register of the controller, wherein transmitting the first bit on the data line is in response to outputting the first bit into the transmit holding register; and
generating, by the controller, an interrupt based on the collision, wherein the interrupt delays future transmission of a second bit.

19. The method of claim 18, further comprising:
determining, by the controller, that a collision has not occurred on the data line based on the line level of the data line corresponds to the first bit; and
transmitting, by the controller, a second bit on the data line.

20. A storage device comprising:
a storage element;
an interface coupled to a data bus;
a controller configured to:
transmit a first bit on a data line;
determine a line level of the data line after transmitting the first bit to the data line;
determine whether the line level of the data line corresponds to the first bit;
determine that a collision occurred on the data line in response to determining that the line level of the data line does not correspond to the first bit; and
generate an interrupt based on the collision, wherein the interrupt delays future transmission of a second bit by stopping transmitting on the data line until the data line has undergone a reset, and wherein the reset occurs when a logical "1" is written to the data line during a first clock cycle of a clock signal; and
an arbitration module configured to release data to a transmit holding register when a line level of the data bus corresponds to a first bit of a data bus.

21. The storage device of claim 20, wherein the controller is further configured to:
determine that a collision has not occurred on the data line based on determining that the line level corresponds to the first bit; and
transmit a second bit on the data line based on determining that the collision has not occurred.

22. The storage device of claim 20, wherein the controller is further configured to generate an acknowledgement indicating data was successfully received.

23. The storage device of claim 20, wherein the controller is further configured to determine that the data line has been reset when receiving a negative acknowledgement during a first clock cycle of a clock signal.

24. The storage device of claim 20, wherein determining that a collision occurred on the data line occurs during a rising edge of a clock cycle of a clock signal.

* * * * *